(12) United States Patent
Matusek et al.

(10) Patent No.: US 6,701,784 B1
(45) Date of Patent: Mar. 9, 2004

(54) CARBURETOR FUEL LEVEL MANAGEMENT SYSTEM

(75) Inventors: Steve M. Matusek, Overland Park, KS (US); Shawn D. Wessol, Parkville, MO (US)

(73) Assignee: Aeromotive, Inc., Merriam, KS (US)

( * ) Notice: Subject to any disclaimer, the term of this patent is extended or adjusted under 35 U.S.C. 154(b) by 0 days.

(21) Appl. No.: 10/349,287

(22) Filed: Jan. 22, 2003

(51) Int. Cl.$^7$ ............................................... G01F 23/36
(52) U.S. Cl. ............................. 73/313; 73/313; 73/314
(58) Field of Search ............................ 73/290 R, 313, 73/314

(56) References Cited

U.S. PATENT DOCUMENTS

| | | | |
|---|---|---|---|
| 3,655,059 A | * 4/1972 | Johnson | 210/446 |
| 3,691,824 A | 9/1972 | Vanderbilt, Jr. et al. | |
| 3,738,344 A | * 6/1973 | Bandimere | 123/506 |
| 3,870,972 A | 3/1975 | Vanderbilt, Jr. et al. | |
| 3,875,267 A | * 4/1975 | Seki et al. | 261/70 |
| 3,875,918 A | * 4/1975 | Loynd | 123/184.56 |
| 3,994,998 A | * 11/1976 | Mineck | 261/50.2 |
| 4,088,715 A | * 5/1978 | Graybill | 261/36.2 |
| 4,094,931 A | * 6/1978 | Karino | 261/23.3 |
| 4,168,288 A | * 9/1979 | Nau et al. | 261/35 |
| 4,194,395 A | 3/1980 | Wood | |
| 4,226,218 A | * 10/1980 | Lutz | 123/325 |
| 4,255,175 A | * 3/1981 | Wilkins | 55/357 |
| 4,271,098 A | * 6/1981 | Henning et al. | 261/66 |
| 4,350,124 A | * 9/1982 | Kitano et al. | 123/198 R |
| 4,479,116 A | 10/1984 | Kobayashi | |
| 4,526,152 A | 7/1985 | Hideg et al. | |
| 5,613,398 A | 3/1997 | Lawson | |
| 6,164,132 A | 12/2000 | Matulek | |
| 6,237,412 B1 | 5/2001 | Morimoto | |
| 6,273,065 B1 | * 8/2001 | Carpenter | 123/436 |
| 6,286,817 B1 | 9/2001 | Grant | |
| 6,427,533 B1 | 8/2002 | Yoshida | |
| 6,554,258 B2 | * 4/2003 | Braswell | 261/70 |
| 2001/0037680 A1 | 11/2001 | Buck et al. | |

FOREIGN PATENT DOCUMENTS

JP  352053452 A  4/1977

* cited by examiner

Primary Examiner—Hezron Williams
Assistant Examiner—Katina Wilson
(74) Attorney, Agent, or Firm—Erickson & Kleypas, L.L.C.

(57) ABSTRACT

A carburetor fuel level management system includes a fuel level sensor mounted in the float bowl of the carburetor for monitoring actual fuel level and providing a signal indicative of the fuel level. The sensor may be used for data acquisition and/or to provide feedback to a controller which maintains fuel level at or near a preferred level by varying fuel flow rate into the float bowl in response to an indication from the sensor that the actual fuel level differs from the preferred fuel level. Fuel flow rate may be controlled by selectively bypassing a fuel pressure regulator in the carburetor inlet line or by varying voltage to an electric fuel pump, among other methods.

23 Claims, 3 Drawing Sheets

CARBURETOR FUEL LEVEL MANAGEMENT SYSTEM

BACKGROUND OF THE INVENTION

1. Field of the Invention

This invention relates to carburetor fuel level sensors and to a management system for monitoring fuel level in a carburetor float bowl and maintaining the fuel level at a desired level.

2. Description of the Related Art

In racing applications it is common to monitor various parameters of the vehicle and acquire data for use in tuning the vehicle for maximum performance. For example, in drag racing applications it is common to monitor engine RPM, exhaust temperature for each cylinder, manifold vacuum or pressure, fuel pressure, drive shaft RPM, G-force and suspension travel. These parameters are plotted against time and stored for later download and analysis. In other types of racing, telemetry is used to transmit the data to a remote receiver for contemporaneous analysis.

One engine parameter which is not monitored is the fuel level in the float bowl of the vehicle's carburetor. (Carburetors are still commonly used for fuel delivery in racing and other high performance applications even though they are no longer commonly used in production automobiles.) Fuel level is critical because the engine will run too rich if the fuel level is too high and too lean if the fuel level is too low. Either condition can drastically effect performance.

Fuel level is statically set to a preferred level by adjusting a float valve at the carburetor inlet and observing the float level through a "trickle hole" or sight glass in the carburetor bowl. There is presently, however, no means for monitoring the fuel level during an event to determine if it stays at or near the preferred level, nor is there means for maintaining the fuel level at the preferred level.

U.S. Pat. No. 3,691,824 to Vanderbilt, Jr. et al. discloses a Carburetor Evaluation System having a fuel level sensor probe which comprises a pair of vertically spaced thermistors with a heating coil positioned midway therebetween. The probe is moved up and down a wall of the fuel bowl to determine the fuel level. As the probe is moved, resistance in the thermistors will vary with the temperature of the adjacent portion of the float bowl wall. Because fuel in the bowl will conduct heat away from the float bowl wall, the temperature of the wall will be lower below the fuel level. The resistance of the thermistors will thus be approximately equal when both thermistors are positioned either above the fuel level or below the fuel level. When one thermistor is below the fuel level and the other is above the fuel level, there will be a difference in resistance. The difference in resistance will be greatest when the fuel level is aligned with the heating coil an thus midway between the thermistors. The probe can thus be used to locate the fuel level by moving it up and down until the point of greatest difference in resistance is found.

Because the probe must be moved up and down the fuel bowl wall to locate the fuel level, it is only useful as a test instrument for use on a stationary vehicle or an engine on a test stand. It cannot, however, be used to sense changes in fuel level while a vehicle is in motion. The evaluation system is used solely for data acquisition and is not provided with any means for controlling fuel level in the bowl.

Hideg et al., U.S. Pat. No. 4,526,152, discloses a low pressure fuel injection system having a sealed fuel chamber which is normally full of fuel. Under high temperature conditions, some of the fuel may vaporize, causing the fuel level to drop. A float in the bowl is equipped with a Hall effect head which cooperates with a second head mounted in the top of the bowl to measure changes in fuel level. As the fuel level drops, the two heads move apart. When the level drops too low, a signal is sent to a valve in a fuel return line to vent vapor from the chamber, thereby allowing the fuel level to rise. This system thus employs a fuel level sensor to control fuel level in a fuel chamber, however, the system is neither intended for, nor easily adaptable to carburetor vehicles.

There remains, therefore, a need for a carburetor fuel level sensor which can sense changes in fuel level in a moving vehicle, as well as for a system using such a sensor to maintain fuel level at a desired level.

SUMMARY OF THE INVENTION

The present invention comprises a carburetor fuel level management system for an internal combustion engine with a carburetor. The system includes a fuel level sensor connected to the float bowl of the carburetor and providing an indication of actual fuel level in the float bowl. The sensor may, for example, comprise a pair of generally parallel spaced apart conductors mounted in the float bowl and oriented generally vertically. As the fuel level in the float bowl varies from the desired fuel level, electrical resistance and capacitance across the conductors will vary in proportion to the variation in fuel level. A circuit connected to the conductors typically includes a signal conditioner which produces a signal having a voltage which varies in proportion to the changes in resistance or capacitance across the conductors. The signal is transmitted to a computer which reads the signal and makes a determination of actual fuel level the float bowl therefrom.

The system can also be used to maintain fuel level in the float bowl at or near the desired level by selectively varying fuel flow rate through the inlet line into the float bowl and using the fuel level sensor to provide feedback of actual fuel level. For example, if a fuel pressure regulator is mounted in the inlet line, the computer can selectively operate a solenoid valve mounted in a bypass line which bypasses the fuel pressure regulator. When the solenoid valve is open, fuel of higher than normal pressure is directed to the carburetor inlet, causing the fuel level to rise. Alternatively, if an electric fuel pump is used to move fuel through the inlet line, the computer can control the fuel flow rate by varying the supply voltage to the fuel pump.

If the fuel system supplying fuel to the carburetor includes an external bypass for returning excess fuel to the fuel tank, the fuel level management system can be used to selectively open and close a solenoid valve controlling fuel flow through the inlet line in response to feedback from the fuel level sensor. In this application, the fuel level management system performs a function which is analogous to that normally performed by the mechanical float and float valve in the carburetor bowl. The electronic fuel level management system, however, is capable of working at higher fuel pressures than is a mechanical float valve. The system can thus be used in addition to, or in place of, the mechanical float valve.

DETAILED DESCRIPTION OF THE PREFERRED EMBODIMENT

Figure 1:
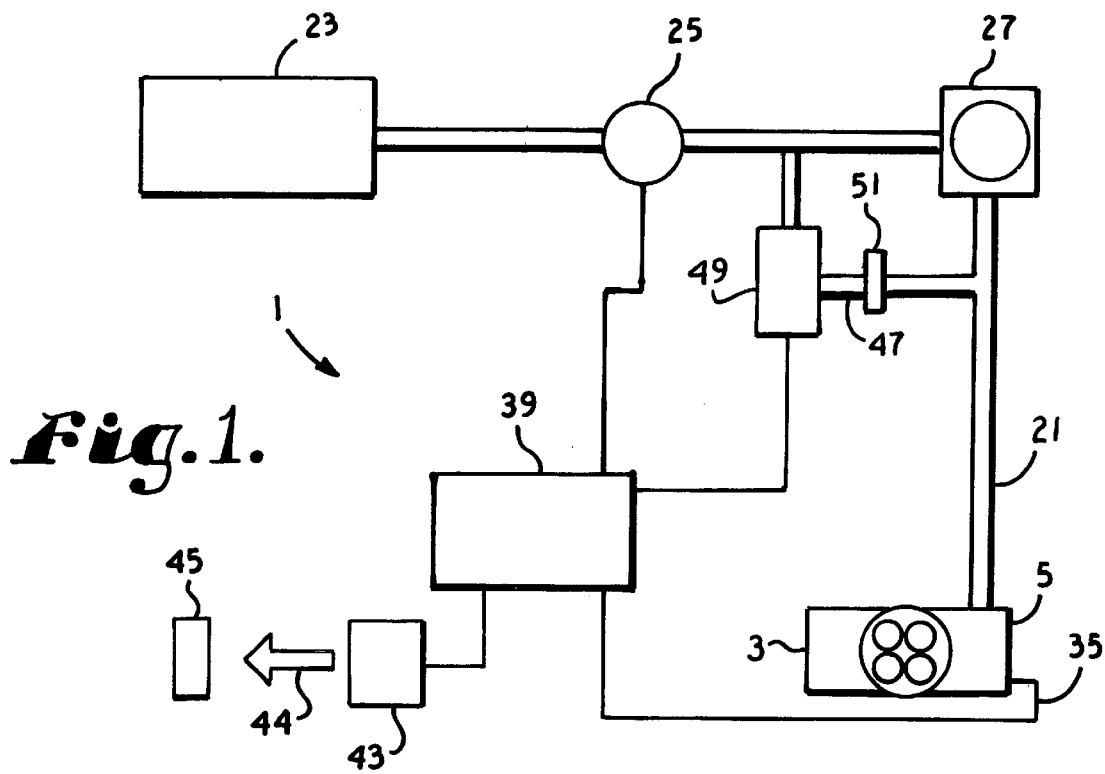
FIG. 1 is a schematic diagram of a carburetor fuel level management system embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference number 1 generally designates a carburetor fuel level management system embodying the present invention. The system 1 is for use with an internal combustion engine (not shown) having a carburetor 3. The carburetor 3 includes a float bowl 5 (see FIG. 2) having a top wall 7, a bottom wall 9 and side walls 11. Mounted in the float bowl 5 is a float 13 connected to a float valve 15 which controls fuel flow into the bowl 5 through an inlet 17. The float valve 15 is manually adjustable to statically set the fuel level in the bowl 5 to a desired level 19. As the engine is operated, the actual fuel level, indicated by lines 19a or 19b, will vary from the desired level 19 and may be above or below the desired level 19.

Referring to FIG. 1, fuel is supplied to the inlet 17 of the carburetor 3 through a fuel line 21 from a fuel tank 23. The fuel is moved through the line 21 and pressurized by a fuel pump 25. Fuel pressure at the carburetor inlet 17 may be controlled by a fuel pressure regulator 27 mounted in the line 21 between the pump 25 and the carburetor 3. If a regulator 27 is used, fuel pressure may be, for example, 20–30 psi upstream of the regulator 27 and 5 psi downstream of the regulator 27.

Figure 2:
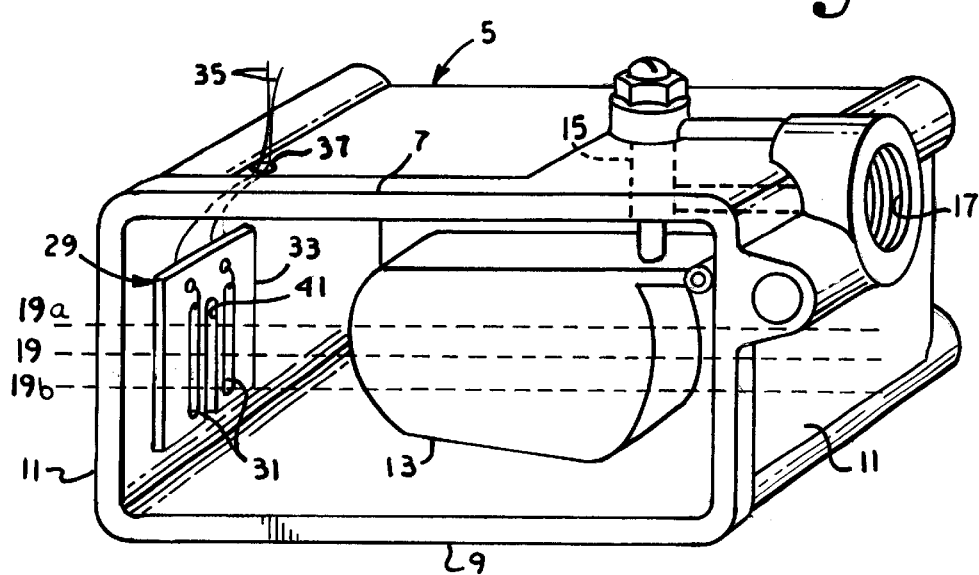
FIG. 2 is a perspective view of a carburetor float bowl having a fuel level sensor mounted therein according to the present invention.

Referring to FIG. 2, the system 1 includes a fuel level sensor 29 operable to read the actual fuel level within the float bowl 5. The sensor 29 may, for example, comprise a pair of parallel spaced apart conductors 31 mounted in the bowl 5 and generally vertically oriented. The conductors 31 are shown mounted on a circuit board 33 which is, in turn, mounted on one of the side walls 11 of the bowl 5. A slot 41 cut into the circuit board 33 between the conductors 31 prevents fuel from wicking up the circuit board 33 and distorting the fuel level reading.

As the fuel level in the bowl 5 varies, the resistance and capacitance across the conductors 31 will vary proportionally with the fuel level. Leads 35 connected to the conductors 31 extend upwardly through a hole 37 in the top wall 7 of the bowl 5. The leads 35 are connected to a circuit which produces a signal which varies in proportion to the changes in the capacitance or resistance across the conductors 31. The circuit typically includes a signal conditioner (not shown) which produces a 0–5 volt signal. The signal is supplied to an electronic controller or computer 39 which converts the signal to an indication of actual fuel level.

The sensor 29 and computer 39 may be used for data acquisition by storing the fuel level data for later download. The computer 39 may also be coupled to a transmitter 43 to transmit the data by telemetry 44 to a remote receiver 45 for contemporaneous analysis. The system 1 may also be used for closed-loop feedback control of fuel delivery to the carburetor 3 so as to maintain the fuel level at the desired level 19.

One way of accomplishing closed-loop control of fuel level is to utilize the computer 39 to increase fuel flow rate to the carburetor by selectively controlling or bypassing the pressure regulator 27. For example, a bypass line 47 may be provided for bypassing the regulator 27. Flow through the bypass line 47 is controlled by a solenoid valve 49. The solenoid valve 49 opens and closes in response to a signal from the computer 39, which receives feedback from the fuel lever sensor 29.

When the sensor 29 senses that the fuel level in the bowl 3 is below the desired level 19, the computer 39 sends a signal to the solenoid valve 49, causing it to open. Higher pressure fuel from upstream of regulator 27 is then diverted to the carburetor 3, raising the fuel level in the bowl 3. Once the sensor 29 indicates that the fuel level is at or near the desired level 19, the computer 39 causes the solenoid valve 49 to close.

It should be noted that the solenoid valve 49 may be either an on/off valve or a proportional valve. In the case of a proportional valve, the computer 39 will send a variable voltage signal to the solenoid valve 49 causing the valve 49 to open in an amount proportionate to the signal. In the case of an on/off valve, the valve 49 will fully open for a brief period, providing a pulse of higher pressure fuel to the carburetor inlet 17. If necessary, an orifice 51 may be placed in the bypass line 47 downstream from the valve 49 to reduce the pressure at the carburetor inlet 17 when the valve 49 is open.

Another method of controlling fuel flow rate at the carburetor inlet 17, and thereby varying the fuel level in the carburetor bowl 5, is to use the computer 39 to control the voltage to the fuel pump 25. As the voltage supplied to the pump 25 is increased (within the pumps operating range), the fuel flow rate will also increase. A system 1 incorporating a fuel pump 25 operated at variable speeds could either omit the regulator 27 or could incorporate a bypass of the regulator 27 as described above.

Figure 3:
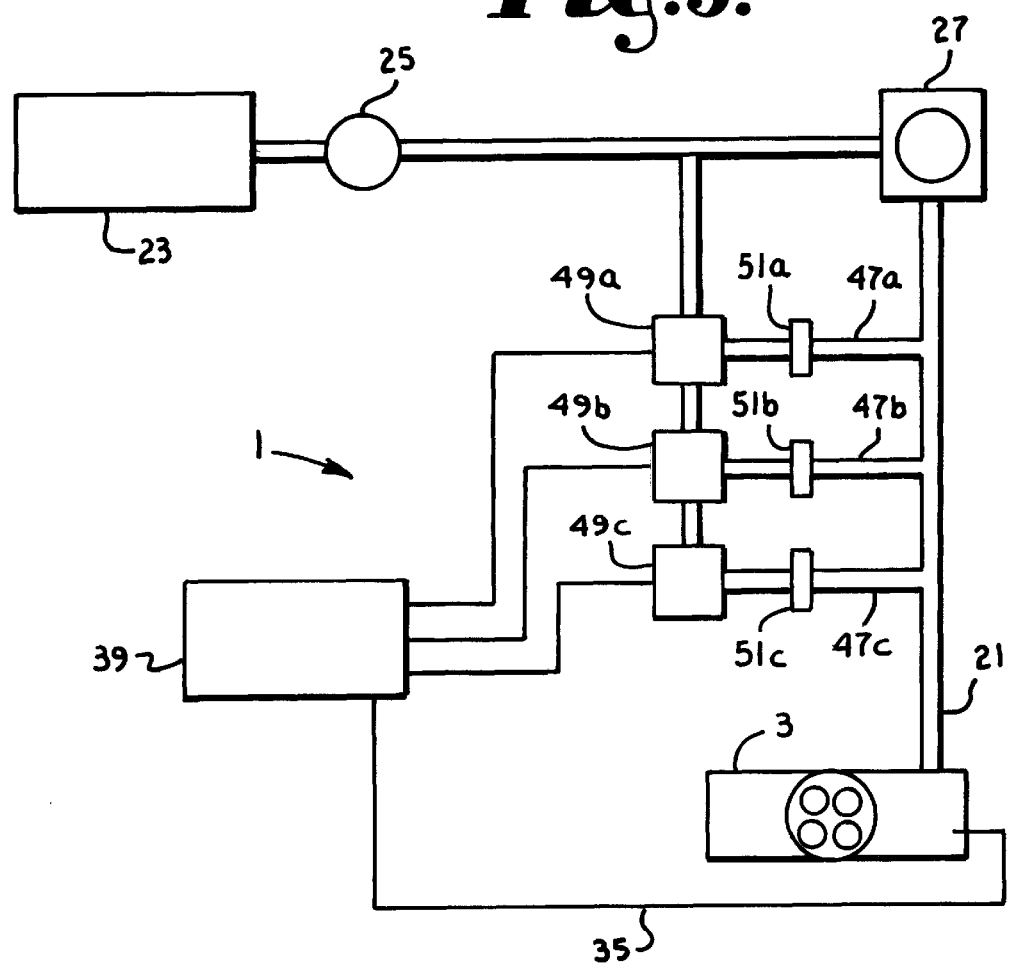
FIG. 3 is a schematic diagram of a first alternative embodiment of the carburetor fuel level management system.

An alternative embodiment of the system 1, shown in FIG. 3, uses multiple parallel bypasses of the regulator 27 (three bypass lines 47a–47c shown). Flow through each bypass line 47a–47c is controlled by a respective solenoid valve 49a–49c. Each solenoid valve 49a–49c is controlled by the computer 39. Each bypass line 47a–47c further includes a respective orifice 51a–51c. The orifices 51a–51c are staggered in size such that orifice 51a might be denominated a small orifice, orifice 51*b* might be denominated a medium orifice, and orifice 51*c* might be denominated a large orifice. The larger the orifice 51*a*–51*c*, the more fuel can flow through the respective bypass line 47*a*–47*c*.

When the sensor 29 indicates that the fuel level is below the desired level 19, the computer 39 opens one or more of the solenoid valves 49*a*–49*c*. The computer 39 selects the valve or valves 49 to open based upon the severity of the fuel shortage in the carburetor bowl 5, as indicated by the sensor 29. If the fuel level does not rise quickly enough, the computer 39 can open more valves 49*a*–49*c* or open valves controlling bypass lines 47*a*–47*c* with larger respective orifices 51*a*–51*c*.

Figure 4:
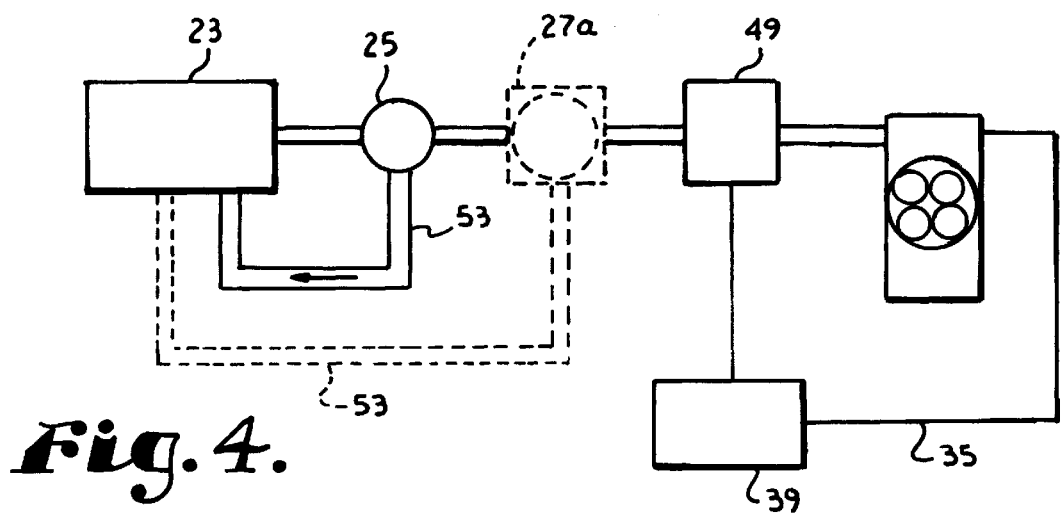
FIG. 4 is a schematic diagram of a second alternative embodiment of the carburetor fuel level management system.

A second alternative embodiment of the carburetor fuel level management system 1 is shown in FIG. 4. In this embodiment, an external bypass 53 is used for returning surplus fuel to the fuel tank 23. The bypass 53 may come directly off of the fuel pump 25 (as shown in solid lines in FIG. 4), or, alternatively, off of a bypass fuel pressure regulator 27*a* (shown in dashed lines in FIG. 4). If the fuel pump 25 includes the external bypass 53, no fuel pressure regulator 27 or 27*a* is required in this embodiment.

Fuel is supplied from the fuel pump 25 to the carburetor 3 through a solenoid valve 49. The solenoid valve 49 is controlled by the computer 39, which in turn receives feedback from the sensor 29. The solenoid valve 49 is thus opened when the fuel level in the bowl 5 drops below the desired level and closed when the desired level is reached. When the solenoid valve 49 is closed, fuel flow to the float bowl 5 is cut off. This is made possible because the external bypass 53 provides a relief passage through which the unused fuel is returned to the fuel tank 23. When the solenoid valve 49 is open, fuel is delivered to the float bowl 5 at relatively high pressure, for example 45 psi. Fuel is thus delivered to the carburetor 3 in relatively short high pressure pulses. A proportional solenoid valve 49 could also be used.

In conventional carburetor applications, high pressure fuel delivery to the carburetor 3 is not feasible because the pressure tends to force open the float valve 15 and flood the carburetor 3. In the present application, however, the solenoid valve 49 acting in combination with the sensor 29 prevents the carburetor 3 from flooding, no matter the condition of the float valve 15. The system can thus be used to deliver fuel at high pressure to any existing carburetor 3, no matter the size of the needle and seat in the float valve 15. Because the system 1 provides a function which is redundant of that provided by the float valve 15, it is also foreseeable that the float valve 15 (or the needle and seat therein) can be removed from the carburetor 3 such that the system 1 functions as an electronic float.

It is to be understood that while certain forms of the present invention have been illustrated and described herein, it is not to be limited to the specific forms or arrangement of parts described and shown. For example, fuel flow to the carburetor could be varied in ways other than those described. Examples might include the use of a variable pressure regulator operated by the controller, a variable orifice in the fuel line, or the use of an auxiliary fuel pump to selectively provide additional fuel.

It is also to be understood that, while the capacitive or resistive sensor 29 described above is preferred for its simplicity, other types of fuel level sensors 29 could be used as well. Other types of sensors 29 capable of reading fuel level would include Hall effect sensors or linear motion transducers connected to the float 13. Optical sensors could be used to read the position of the top of the float 13 and thereby sense fuel level. Ultrasonic sensors could also be used to detect the fuel level.

Figure 5:
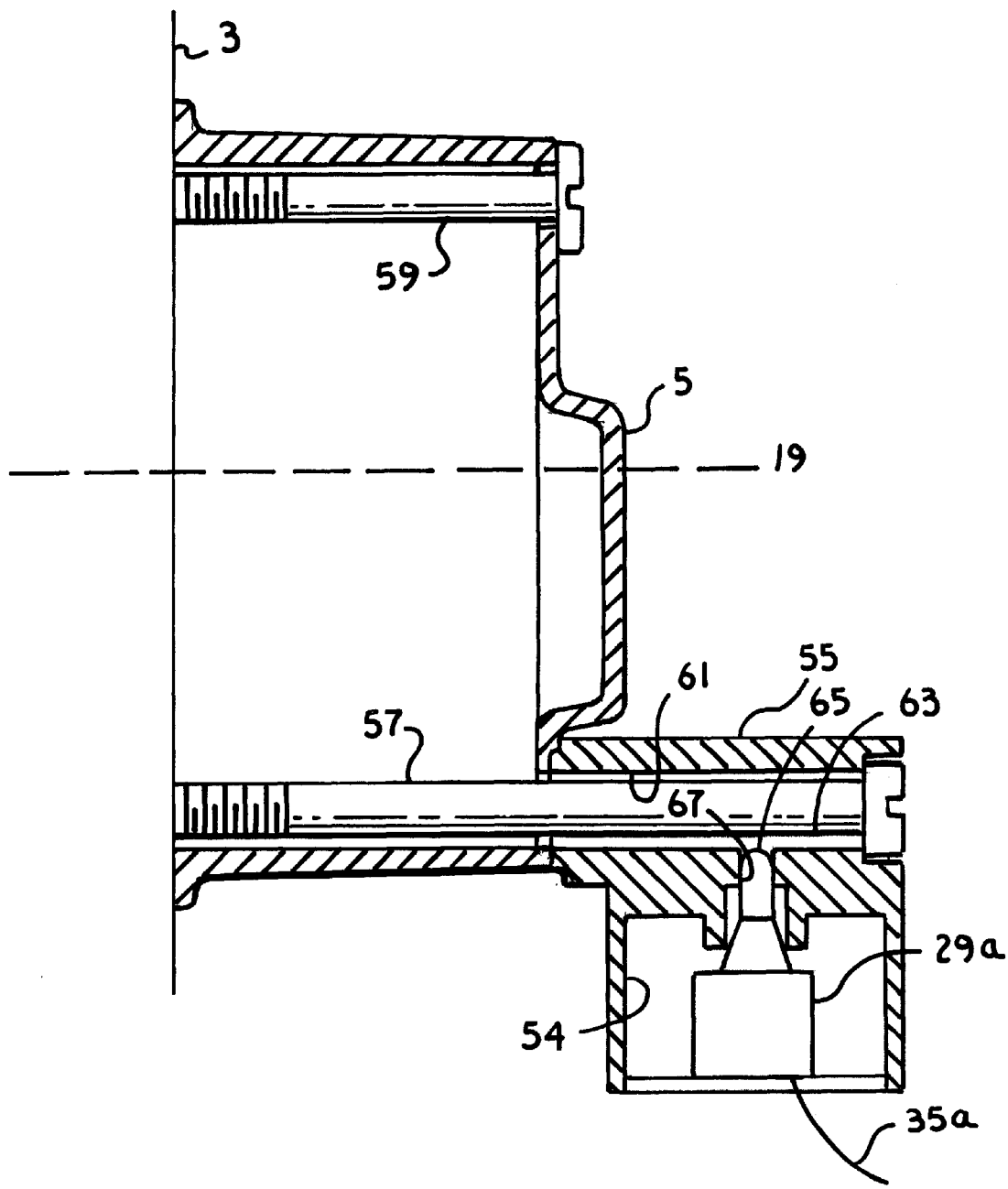
FIG. 5 is a cross-sectional view of a carburetor float bowl having an alternative fuel level sensor mounted thereon according to the present invention.

Yet another device which might be used as a fuel level sensor 29 is a pressure sensor 29*a* which is mounted on the bowl 5 to read the fuel level via fluid pressure. An acceptable pressure sensor 29*a* is the Honeywell® 40PC Series pressure sensor, available through Honeywell Sensing and Control of Freeport, Ill. One way of mounting such a sensor 29*a* is shown in FIG. 5. The sensor 29*a* is mounted inside a cavity 54 formed in a housing 55 which is attached directly to the bowl 5 by a bolt 57. The bolt 57 replaces a lower one of the original float bowl bolts 59 which serve to connect the bowl 5 to the carburetor 3. The bolt 57 passes through a receiver 61 in the housing 55 which is somewhat lager than the diameter of the bolt 57, resulting in a clearance 63 being formed between the bolt 57 and the housing 55. A tip 65 of the sensor 29*a* is positioned in a bore 67 which is below and in communication with the clearance 63. The weight of any fuel in the bowl 5 thus acts on the tip 65 of the sensor 29*a* through the clearance 63. The sensor 29*a* reads the pressure created by the weight of the fuel in the bowl acting on the tip 65 and sends a signal representative thereof to the computer 39 through circuitry including a lead or leads 35*a*. The computer 39 can then calculate the fuel level 19 from the pressure reading.

What is claimed and desired to be secured by Letters Patent is as follows:

1. In a motor vehicle having an internal combustion engine with a carburetor, the carburetor having a float bowl with a fuel inlet, a fuel level management system comprising:
   a) a fuel level sensor connected to the float bowl and providing a signal indicative of actual fuel level in the float bowl while the motor vehicle is moving;
   b) an electronic controller; and
   c) means for varying fuel flow rate through said fuel inlet, said means being operated by said controller in response to an indication from said fuel level sensor that the actual fuel level in the float bowl differs from a desired fuel level.

2. A carburetor fuel level management system for an internal combustion engine with a carburetor having a float bowl and an inlet line feeding fuel into the float bowl, said system comprising:
   a) an electronic controller;
   b) a fuel level sensor connected to the float bowl and providing an indication of actual fuel level in said float bowl to said controller; and
   c) means for varying fuel flow rate through said inlet line into said float bowl, said means being operated by said controller in response to an indication from said fuel level sensor that the actual fuel level in the float bowl differs from a desired fuel level.

3. The system as in claim 2 wherein a fuel pressure regulator is mounted in said inlet line and said means for varying fuel flow rate comprises a bypass line bypassing said fuel pressure regulator and a solenoid valve controlling fuel flow through said bypass line, said solenoid valve being operated by said controller.

4. The system as in claim 3 wherein said solenoid valve is a proportional valve.

5. The system as in claim 3 wherein said solenoid valve is an on/off valve.

6. The system as in claim 3 and further including an orifice mounted in said bypass line and reducing fuel flow therethrough.

7. The system as in claim 3 wherein said bypass line is a first bypass line and said means for varying fuel flow rate further includes at least one additional bypass line, each said additional bypass line having a respective solenoid valve operated by said controller and controlling fuel flow therethrough, at least one of said bypass lines having an orifice mounted therein and reducing fuel flow therethrough.

8. The system as in claim 7 wherein each said bypass line includes an orifice mounted therein and reducing fuel flow therethrough, said orifices being staggered in size such that fuel flow through each said bypass line is at a different rate when the respective solenoid valve is open.

9. The system as in claim 2 wherein an electric fuel pump moves fuel through said inlet line and said means for varying flow rate comprises said controller varying a supply voltage to said fuel pump.

10. The system as in claim 2 wherein said means for varying flow rate comprises a solenoid valve controlling flow through said inlet line said solenoid valve being operated by said controller.

11. The system as in claim 2 wherein said fuel level sensor comprises:
  a) a circuit board mounted on a wall of said float bowl, said circuit board having a pair of generally parallel spaced apart conductors mounted thereon, said conductors being oriented generally vertically; wherein
  b) as an actual fuel level in said float bowl varies from a desired fuel level, electrical resistance or capacitance across said conductors varies in proportion to the variation in fuel level.

12. The system as in claim 11 wherein said circuit board includes a slot between said conductors for preventing fuel from wicking up said circuit board.

13. The system as in claim 2 wherein said sensor comprises a pressure transducer connected to the float bowl and operable to read fluid pressure acting thereon, said fluid pressure being determined by the actual fuel level in the float bowl.

14. A carburetor fuel level management system for an internal combustion engine with a carburetor having a float bowl, an inlet line feeding the float bowl, and a fuel pressure regulator mounted in the inlet line, said system comprising:
  a) an electronic controller;
  b) a fuel level sensor connected to the float bowl and providing an indication of actual fuel level in said float bowl to said controller;
  c) a bypass line connected to the inlet line and bypassing the pressure regulator; and
  d) a solenoid valve controlling fuel flow through said bypass line; said solenoid valve being operated by said controller in response to an indication from said fuel level sensor that the actual fuel level in the float bowl differs from a desired fuel level.

15. The system as in claim 14 wherein said solenoid valve is a proportional valve.

16. The system as in claim 14 wherein said solenoid valve is an on/off valve.

17. The system as in claim 14 further including an orifice mounted in said bypass line and reducing fuel flow therethrough.

18. The system as in claim 14 wherein said bypass line is a first bypass line and said means for varying fuel flow rate further includes at least one additional bypass line, each said additional bypass line having a respective solenoid valve operated by said controller and controlling fuel flow therethrough, at least one of said bypass lines having an orifice mounted therein and reducing fuel flow therethrough.

19. The system as in claim 18 wherein each said bypass line includes an orifice mounted therein and reducing fuel flow therethrough, said orifices being staggered in size such that fuel flow through each said bypass line is at a different rate when the respective solenoid valve is open.

20. A carburetor fuel level management system for an internal combustion engine with a carburetor having a float bowl, an inlet line feeding the float bowl, and an electric fuel pump moving fuel through the inlet line, said system comprising:
  a) an electronic controller; and
  b) a fuel level sensor connected to the float bowl and providing an indication of actual fuel level in said float bowl to said controller; wherein
  c) said controller controls supply voltage to the electric fuel pump and alters said supply voltage to change pump output in response to an indication from said fuel level sensor that the actual fuel level in the float bowl differs from a desired fuel level.

21. A carburetor fuel level management system for an internal combustion engine with a carburetor having a float bowl and a fuel system supplying fuel to the float bowl from a fuel tank through an inlet line, said fuel system including an external bypass for returning surplus fuel to the fuel tank, said fuel level management system comprising:
  a) an electronic controller;
  b) a fuel level sensor connected to the float bowl and providing an indication of actual fuel level in said float bowl to said controller; and
  c) a solenoid valve controlling fuel flow into the float bowl through the inlet line; said solenoid valve being operated by said controller in response to an indication from said fuel level sensor that the actual fuel level in the float bowl differs from a desired fuel level.

22. In a carburetor having a float bowl, a fuel level sensor comprising:
  a) a circuit board mounted on a wall of said float bowl, said circuit board having a pair of generally parallel spaced apart conductors mounted thereon, said conductors being oriented generally vertically; wherein
  b) as an actual fuel level in said float bowl varies, electrical resistance or capacitance across said conductors varies in proportion to the variation in fuel level.

23. The sensor as in claim 22 wherein said circuit board includes a slot between said conductors for preventing fuel from wicking up said circuit board.

* * * * *